US012624790B2

(12) United States Patent  
Li et al.

(10) Patent No.: US 12,624,790 B2  
(45) Date of Patent: May 12, 2026

(54) ROTATING SHAFT APPARATUS AND ELECTRONIC DEVICE

(71) Applicant: HUAWEI TECHNOLOGIES CO., LTD., Shenzhen (CN)

(72) Inventors: Wenyuan Li, Chengdu (CN); Yangming Lin, Dongguan (CN); Feng Jiang, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 316 days.

(21) Appl. No.: 18/393,779

(22) Filed: Dec. 22, 2023

(65) Prior Publication Data

US 2024/0117918 A1     Apr. 11, 2024

Related U.S. Application Data

(63) Continuation of application No. PCT/CN2022/075477, filed on Feb. 8, 2022.

(30) Foreign Application Priority Data

Jun. 24, 2021     (CN) .......................... 202121418820.4

(51) Int. Cl.  
*F16M 11/10*          (2006.01)

(52) U.S. Cl.  
CPC ....... *F16M 11/10* (2013.01); *F16M 2200/041* (2013.01)

(58) Field of Classification Search  
CPC .......... F16C 11/10; F16C 11/12; F16M 11/22; F16M 2200/041

USPC .................................................... 16/342, 289  
See application file for complete search history.

(56) References Cited

U.S. PATENT DOCUMENTS

| | | | |
|---|---|---|---|
| 6,145,397 A | 11/2000 | Nzeadibe et al. | |
| 7,349,203 B2 | 3/2008 | Jobs et al. | |
| 8,672,277 B2 * | 3/2014 | Hsu ........................ | F16M 11/38 |
| | | | 248/371 |
| 9,936,593 B2 * | 4/2018 | Deily ................... | H05K 5/0226 |
| 10,172,248 B1 * | 1/2019 | Park ...................... | F16M 11/38 |
| 10,190,724 B2 * | 1/2019 | Yen ........................ | F16M 11/10 |

(Continued)

FOREIGN PATENT DOCUMENTS

| | | |
|---|---|---|
| CN | 101498336 B | 12/2010 |
| CN | 208311836 U | 1/2019 |

(Continued)

OTHER PUBLICATIONS

PCT International Search Report for Application No. PCT/CN2022/075477 dated Feb. 8, 2022, 10 pages.

(Continued)

*Primary Examiner* — Jeffrey O'Brien

(57) ABSTRACT

A rotating shaft apparatus is provided, where the rotating shaft apparatus includes an adapter member, a spindle, and a crank-slider mechanism. The adapter member is fixedly connected to a load. The spindle is fixedly connected to the adapter member. The crank-slider mechanism acts on the spindle to provide a torque. The torque partially or completely counteracts a gravitational torque of the load. A compression spring is disposed in the crank-slider mechanism. A spring force of the compression spring acts on the spindle, so that the spring force changes with rotation of the spindle.

20 Claims, 11 Drawing Sheets

(56)     References Cited

U.S. PATENT DOCUMENTS

| 10,754,391 | B2 * | 8/2020 | Park .................... H05K 5/0217 |
|---|---|---|---|
| 10,785,553 | B2 | 9/2020 | Sang et al. |
| 11,378,225 | B2 * | 7/2022 | Laurent ............... H05K 5/0204 |
| 11,543,069 | B2 * | 1/2023 | Huang .................. F16M 11/10 |
| 2017/0303415 | A1 | 10/2017 | Deily et al. |
| 2020/0292123 | A1 * | 9/2020 | Huang .................. F16M 11/10 |
| 2020/0378481 | A1 | 12/2020 | Laurent et al. |

FOREIGN PATENT DOCUMENTS

| CN | 209023814 | U | 6/2019 |
|---|---|---|---|
| CN | 209262578 | U | 8/2019 |
| CN | 216009239 | U | 3/2022 |
| JP | 2004251439 | A | 9/2004 |
| KR | 20100125879 | A | 12/2010 |
| KR | 101237570 | B1 | 2/2013 |

OTHER PUBLICATIONS

Extended European Search Report for Application No. 22826993.2 dated Sep. 17, 2024, 6 pages.

* cited by examiner

20

40

30

43633

43633

ROTATING SHAFT APPARATUS AND ELECTRONIC DEVICE

CROSS-REFERENCE TO RELATED APPLICATIONS

This application is a continuation of International Application No. PCT/CN2022/075477, filed on Feb. 8, 2022, which claims priority to Chinese Patent Application No. 202121418820.4, filed on Jun. 24, 2021. The disclosures of the aforementioned applications are hereby incorporated by reference in their entireties.

TECHNICAL FIELD

This application relates to the field of electronic device technologies, and in particular, to a rotating shaft apparatus and an electronic device.

BACKGROUND

A display or an all-in-one machine is increasingly used in scenarios such as a lobby, a reception desk, and a home, and users have a higher requirement for a light, thin and simple appearance of the display or the all-in-one machine. For the display or the all-in-one machine, how to reduce a size of a rotating shaft and hide the rotating shaft on a support becomes a key to have the light, thin and simple appearance of the entire machine.

To obtain a lightweight feel of adjusting a pitch angle, a conventional rotating shaft of the display or the all-in-one device uses a torsion spring to counteract a gravitational torque of a display. Due to a limitation of a principle, the rotating shaft needs to be disposed at the center or a lower position of the display. The appearance of the entire machine is similar, and the rotating shaft protrudes from a back of the display. As a result, the back of the display protrudes or a spacing between the display and the support is large, and the light, thin and simple appearance is hardly achieved.

SUMMARY

Embodiments of this disclosure provide a rotating shaft apparatus and an electronic device. A crank-slider mechanism is disposed on a spindle, and a compression spring is disposed in the crank-slider mechanism to provide a spring force that changes with rotation of a rotating shaft. In this way, the rotating shaft apparatus provides assistance in counteracting a gravitational torque of a load. This implements a lightweight feel of an operation of adjusting a pitch angle of the load, reduces space occupied by the rotating shaft apparatus, and meets a requirement for lightness and thinness of the load after the rotating shaft apparatus is installed.

According to a first aspect, this disclosure provides a rotating shaft apparatus, including an adapter member, at least one spindle, and a crank-slider mechanism group. The adapter member is fixedly connected to a load. The spindle is fixedly connected to the adapter member. The crank-slider mechanism group includes at least one crank-slider mechanism. The crank-slider mechanism acts on the spindle to provide a torque, and the torque partially or completely counteracts a gravitational torque of the load. Specifically, the crank-slider mechanism includes a support, at least one crank, a spring guide assembly, a second support plate, and an elastic assembly. The support is connected to the spindle, and is rotatable around the spindle. The crank is disposed in the support, and one end of the crank in an extension direction is fixedly connected to the spindle. The spring guide assembly includes a first support plate and a guide bar. The first support plate is connected to the other end of the crank in the extension direction, and the first support plate is rotatable relative to the crank. One end of the guide bar in an extension direction is fixedly connected to the first support plate. The second support plate is connected to the support, and is rotatable relative to the support. A slot is provided on the second support plate, and the other end of the guide bar in the extension direction slidably fits in the slot. The elastic assembly includes at least one elastic structure. The elastic structure is sleeved on the guide bar and is in a compressed state, one end of the elastic structure abuts against the first support plate, and the other end abuts against the second support plate.

According to the rotating shaft apparatus provided in an embodiment of this disclosure, the crank-slider mechanism is disposed on the spindle, and the elastic assembly is disposed in the crank-slider mechanism to provide a spring force that changes with rotation of a rotating shaft. In this way, the rotating shaft apparatus provides assistance in counteracting a gravitational torque of a load. This reduces space occupied by the rotating shaft apparatus, and meets a requirement for lightness and thinness of the load after the rotating shaft apparatus is installed.

In another possible implementation, the crank-slider mechanism further includes a shaft sleeve. The shaft sleeve is fixedly sleeved on the guide bar. An end that is of the shaft sleeve and that is close to the second support plate slidably fits in the slot. The elastic structure is sleeved on an outer wall of the shaft sleeve. In this way, in a rotation process of the spindle, when the elastic structure changes an amount of compression, a compression spring and an outer wall of the guide bar do not rub against each other and produce noise.

Optionally, the elastic structure is a compression spring.

In another possible implementation, the guide bar includes a guide post and a sliding rod. Extension directions of the guide post and the sliding rod are the same. One end of the guide post in the extension direction is fixedly connected to the first support plate, the other end is fixedly connected to the sliding rod, and the sliding rod passes through the slot. A positioning structure is disposed on the guide post, and is configured to position the shaft sleeve.

Optionally, the positioning structure is a dowel pin, a dowel hole adapted to the dowel pin is provided on the shaft sleeve, and the dowel pin fits in the dowel hole to fasten the shaft sleeve on the guide post.

In another possible implementation, the crank-slider mechanism further includes a spring adjustment shaft sleeve. An avoidance hole is provided at a position that is on the second support plate and that corresponds to the guide bar. The spring adjustment shaft sleeve is in a threaded connection with the avoidance hole. A spring support portion is disposed at an end that is of the spring adjustment shaft sleeve and that is close to the elastic structure. The spring support portion abuts against the elastic structure. The slot is provided at a position that is on the spring adjustment shaft sleeve and that corresponds to the guide bar. An adjustment opening is provided at an end face of an end that is of the spring adjustment shaft sleeve and that is away from the elastic structure. The spring adjustment shaft sleeve is rotated through the adjustment opening, to adjust a spring force of the elastic structure.

The spring adjustment shaft sleeve is disposed in the rotating shaft apparatus in this embodiment of this disclosure, so that a precompression spring force of the elastic structure may be adjusted based on a requirement, to adjust a torque of the rotating shaft. In addition, the spring adjustment shaft sleeve is disposed on the second support plate, to facilitate adjustment of the spring adjustment shaft sleeve.

In another possible implementation, the support includes a first support arm, a second support arm, and a third support arm. Extension directions of the second support arm and the spindle are the same. The first support arm and the third support arm are respectively disposed at two opposite ends of the second support arm. Both the first support arm and the second support arm extend towards a side close to the spindle. A first connection plate is disposed on the first support arm. A second connection plate is disposed on a second connection arm relative to the first connection plate. A first connection hole is provided at an end that is of the first connection plate and that is close to the spindle. A second connection hole is provided at a position that is on the second connection plate and that is opposite to the first connection hole. The spindle passes through the first connection hole and the second connection hole, and rotatably fits in the first connection hole and the second connection hole. In this way, the support and the spindle form a revolute pair.

In another possible implementation, a third connection hole is provided at an end that is of the first connection plate and that is away from the spindle. A fourth connection hole is provided on the second connection plate relative to the third connection hole. Two first rotating shafts are respectively disposed at two opposite ends of the second support plate in an extension direction. The two first rotating shafts respectively pass through the third connection hole and the fourth connection hole, and rotatably fit in the third connection hole and the fourth connection hole. In this way, the second support plate and the support form a revolute pair.

In another possible implementation, the support is of a split structure and includes a main support and a secondary support. The main support includes the first support arm and the second support arm. The secondary support includes the third support arm and a connection portion that is disposed at an end that is of the third support arm and that is close to the second support arm. The connection portion is fixedly connected to the second support arm. This reduces manufacturing difficulty of the support, and facilitates assembly of the second support plate and the support.

In another possible implementation, the rotating shaft apparatus further includes a damping member. The damping member is disposed on the spindle to provide a damping force. For example, the damping member is a disc spring friction plate or a coated damping member, or the like.

In another possible implementation, the at least one spindle includes a first spindle and a second spindle. The crank-slider mechanism group includes a first crank-slider mechanism and a second crank-slider mechanism. The first spindle and the second spindle are disposed on the adapter member at an interval. The first crank-slider mechanism acts on the first spindle to provide a torque. The second crank-slider mechanism acts on the second spindle to provide a torque.

According to the rotating shaft apparatus provided in this embodiment of this disclosure, two spindles are disposed, and two crank-slider mechanisms are disposed corresponding to the two spindles. This ensures stability of the rotating shaft apparatus.

In another possible implementation, the at least one crank includes a first crank and a second crank. The at least one guide bar includes a first guide bar and a second guide bar. The elastic assembly includes a first elastic structure and a second elastic structure. The first crank and the second crank are disposed on the spindle at an interval. A fifth connection hole is provided at an end that is of the first crank and that is away from the spindle. A sixth connection hole is provided on the second crank relative to the fifth connection hole. Two second rotating shafts are respectively disposed at two opposite ends of the first support plate in an extension direction. The two second rotating shafts respectively pass through the fifth connection hole and the sixth connection hole, and rotatably fit in the fifth connection hole and the sixth connection hole. The first guide bar and the second guide bar are disposed on the first support plate at an interval. The first elastic structure is sleeved on the first guide bar. The second elastic structure is sleeved on the second guide bar.

According to a second aspect, this disclosure further provides an electronic device, including a support apparatus, the rotating shaft apparatus according to the first aspect, and a display apparatus or an all-in-one machine. An end that is of a support and that is away from a spindle is fixedly connected to the support apparatus. An adapter member is fixedly connected to the display apparatus or the all-in-one machine.

In a possible implementation, a connection position between the adapter member and the display apparatus is above a center of gravity of the display apparatus; or, a connection position between the adapter member and the all-in-one machine is above a center of gravity of the all-in-one machine. This implements eccentric assembly of a rotating shaft and the display apparatus or the all-in-one machine, implements a large pitch angle of the display apparatus or the all-in-one machine, and does not affect a lightweight feel of an operation of adjusting the pitch angle of the display apparatus or the all-in-one machine.

In another possible implementation, an accommodation cavity is provided at an end that is of the support apparatus and that is close to the display apparatus or the all-in-one machine, and the rotating shaft apparatus is disposed in the accommodation cavity. In this way, the rotating shaft device is hidden in the support apparatus. This reduces a distance between the display apparatus or the all-in-one machine and the support, and implements a light and thin appearance effect where the support apparatus is closely attached to the display apparatus or the all-in-one machine.

BRIEF DESCRIPTION OF DRAWINGS

The following briefly describes accompanying drawings used in describing embodiments or the conventional technology.

5

6

Figure 6A:
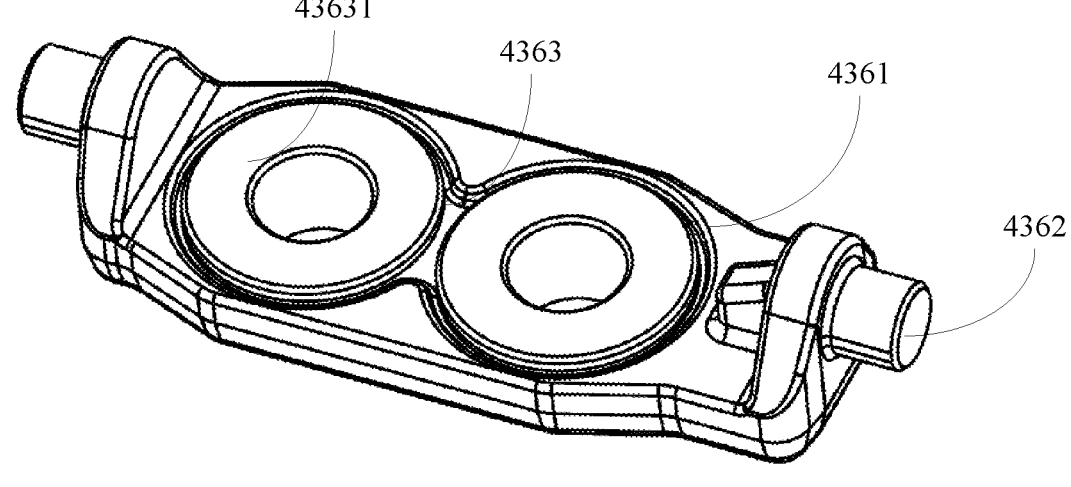
Figure 6B:
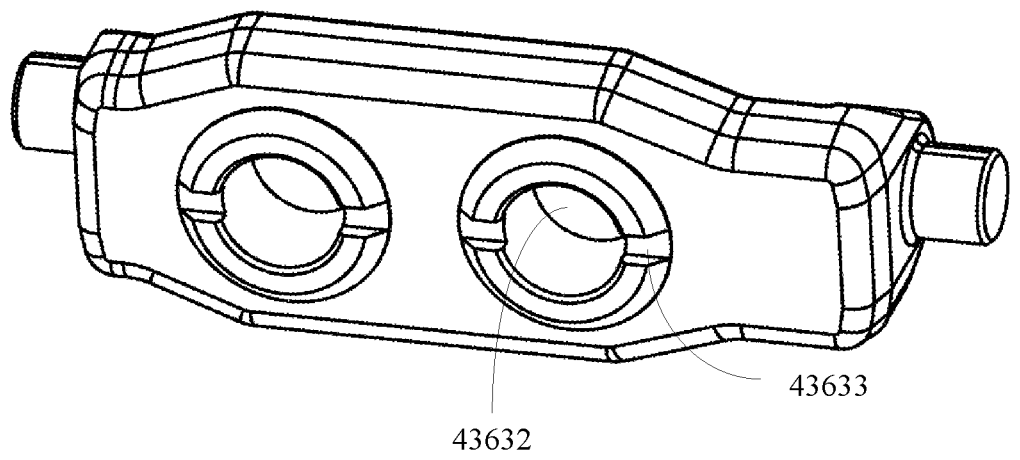
Figure 6C:
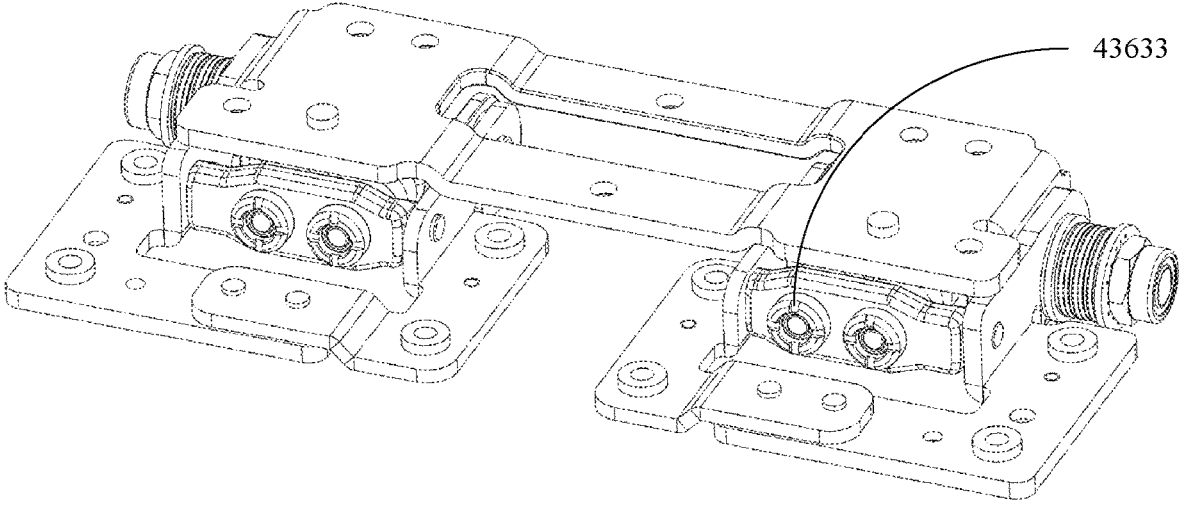
Figure 6D:
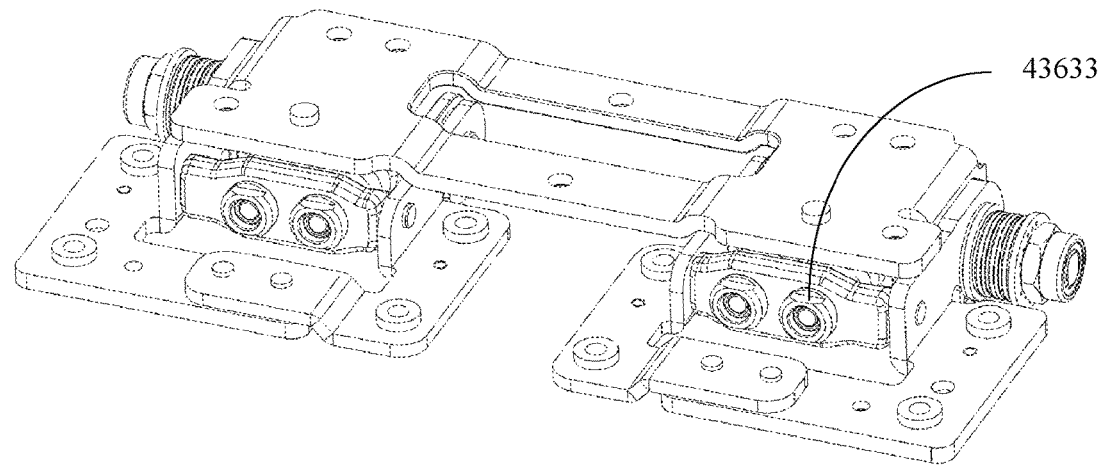
Figure 7A:
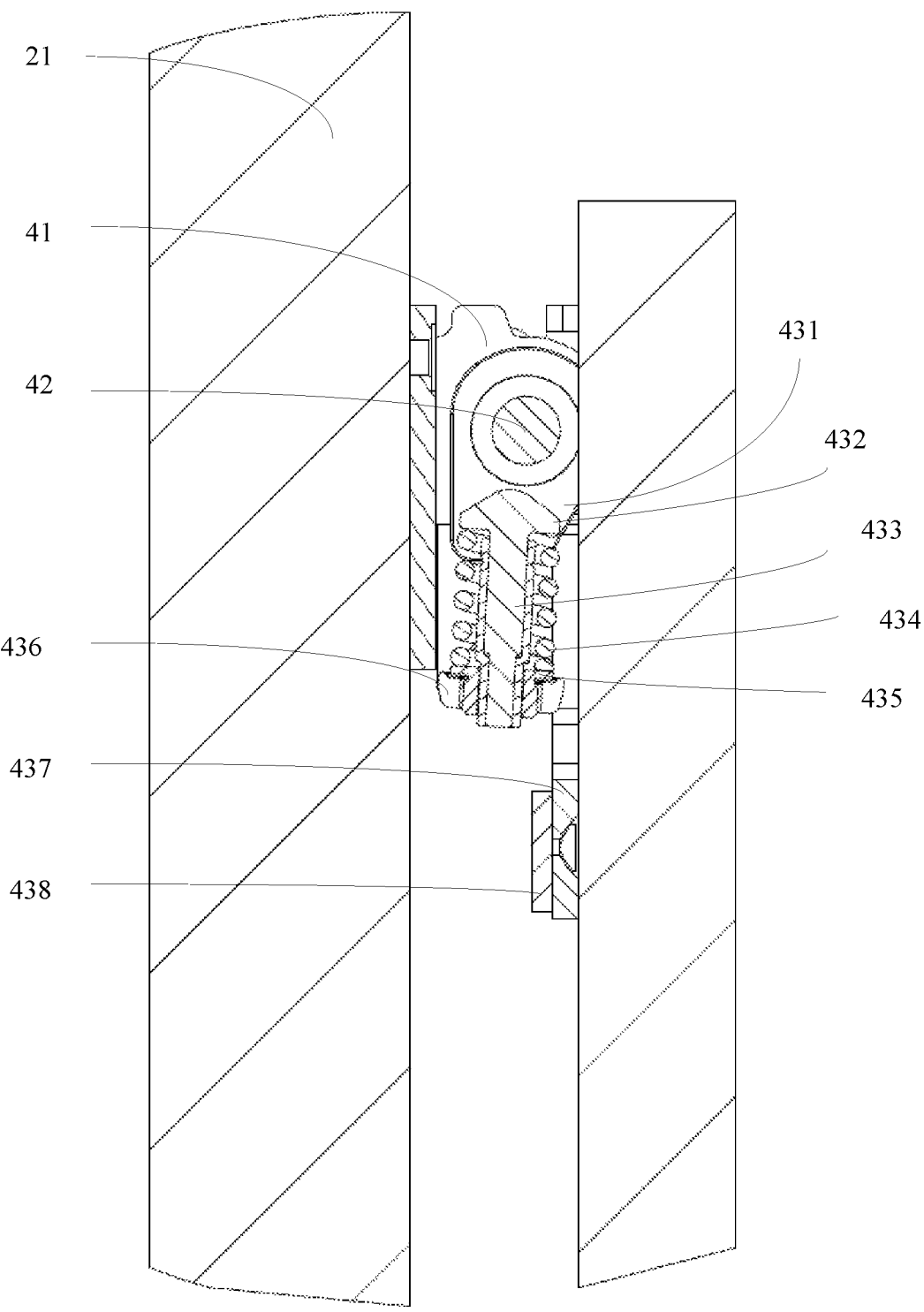
Figure 7B:
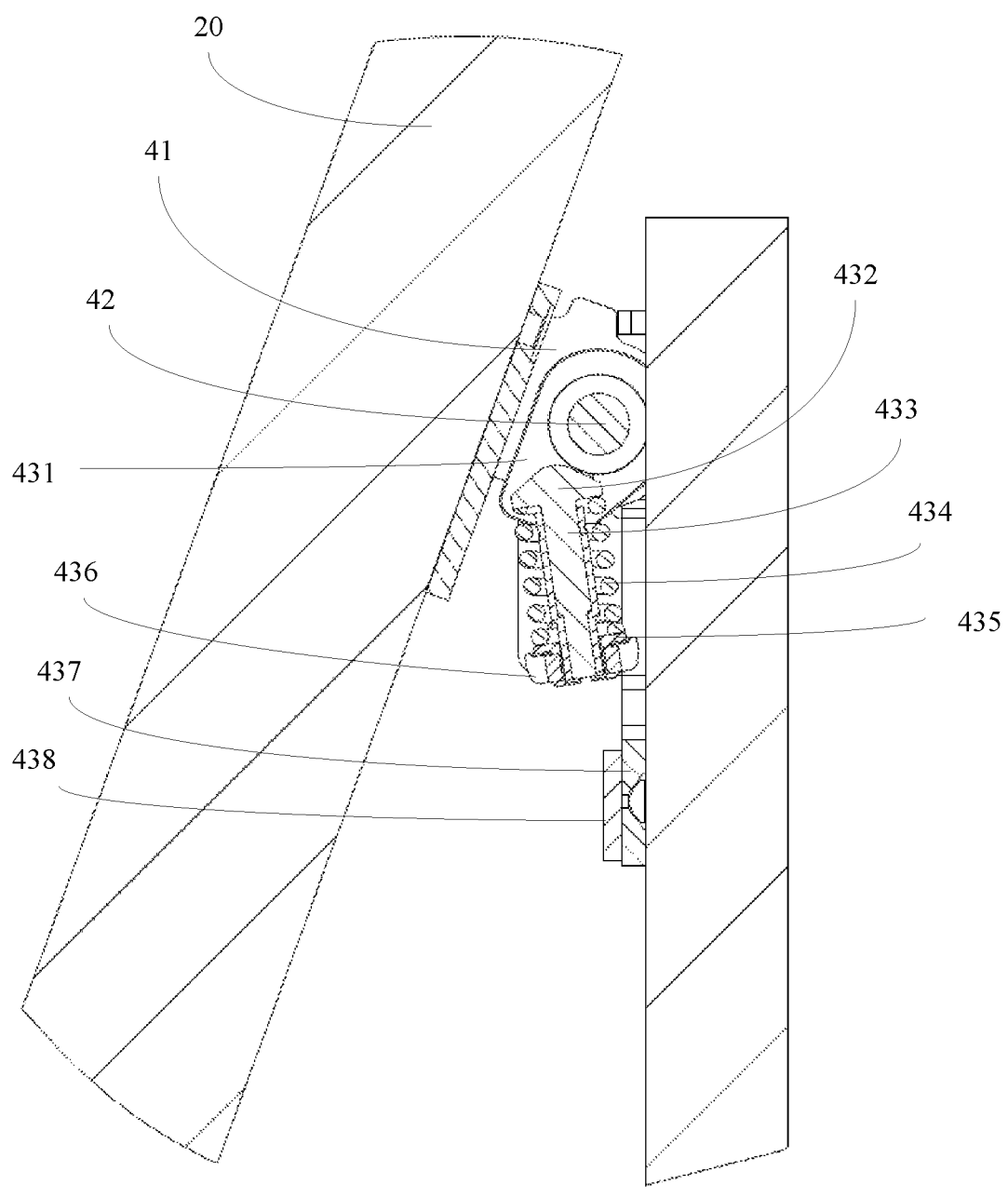
Figure 8:
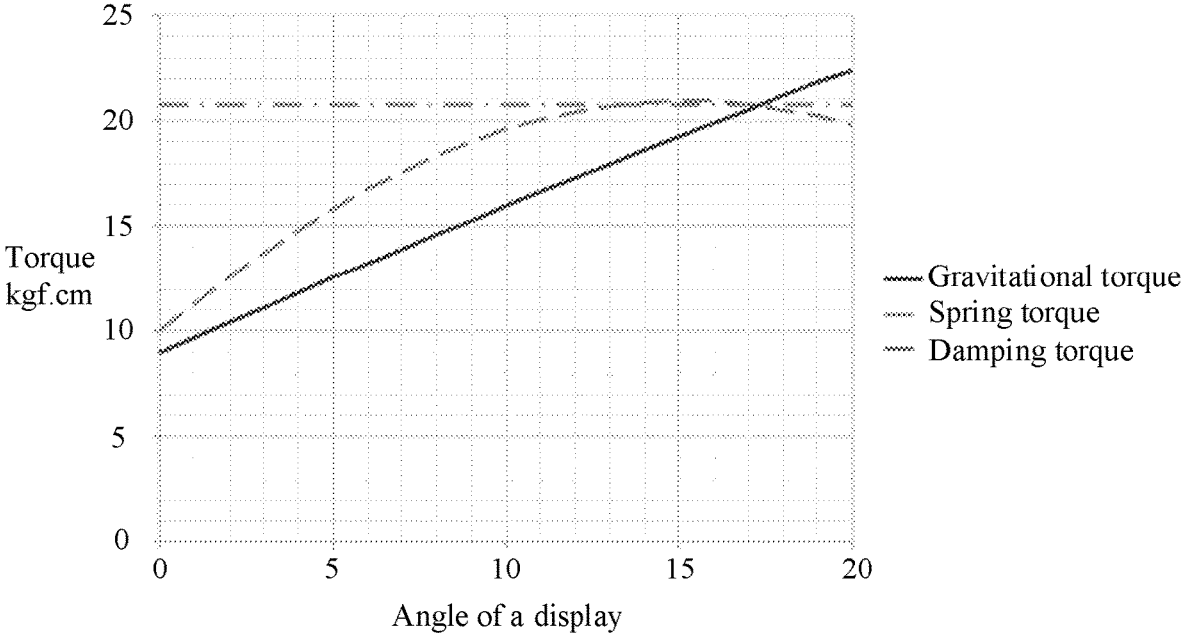
Figure 9:
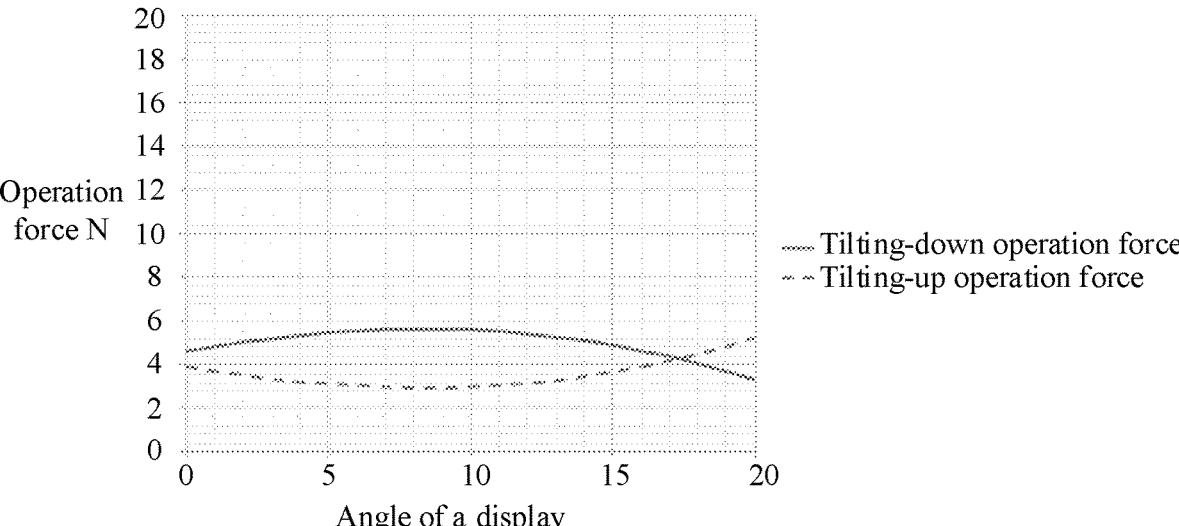

FIG. 6*a* is a schematic diagram of a structure of a second support plate of a rotating shaft apparatus according to an embodiment of this disclosure;

FIG. 6*b* is a view of an angle of a second support plate of a rotating shaft apparatus according to an embodiment of this disclosure;

FIG. 6*c* is a view of an adjustment opening of a spring adjustment shaft sleeve of a rotating shaft apparatus according to an embodiment of this disclosure;

FIG. 6*d* is a view of another adjustment opening of a spring adjustment shaft sleeve of a rotating shaft apparatus according to an embodiment of this disclosure;

FIG. 7*a* is a view of a display of a vertical angle that uses a rotating shaft apparatus according to an embodiment of this disclosure;

FIG. 7*b* is a view of a display of 25° that uses a rotating shaft apparatus according to an embodiment of this disclosure;

FIG. 8 is a diagram of a relationship among a gravitational torque of a load that uses a rotating shaft apparatus according to an embodiment of this disclosure, a spring torque, and a damping torque; and FIG. 9 is a diagram of a range of a tilting-down operation force and a tilting-up operation force acting on a load that uses a rotating shaft apparatus according to an embodiment of this disclosure.

DESCRIPTION OF EMBODIMENTS

The following describes technical solutions in embodiments of this disclosure with reference to accompanying drawings in embodiments of this disclosure.

In descriptions of this disclosure, an orientation or position relationship indicated by terms "center", "upper", "lower", "front", "rear", "left", "right", "vertical", "horizontal", "top", "bottom", "inside", "outside", or the like is an orientation or position relationship based on the accompanying drawings, and is only intended for ease of describing this disclosure and simplifying description, rather than indicating or implying that a mentioned apparatus or element needs to have a specific orientation, or needs to be constructed and operated in a specific orientation. Therefore, the orientation or position relationship shall not be understood as a limitation on this disclosure.

In descriptions of this disclosure, it should be noted that, unless otherwise clearly specified and limited, terms "dispose", "interconnect", and "connect" should be understood in a broad sense. For example, such terms may indicate a fixed connection, a detachable connection, an abutting connection or an integral connection. Persons of ordinary skill in the art may understand specific meanings of the foregoing terms in this disclosure based on a specific situation.

Figure 1:
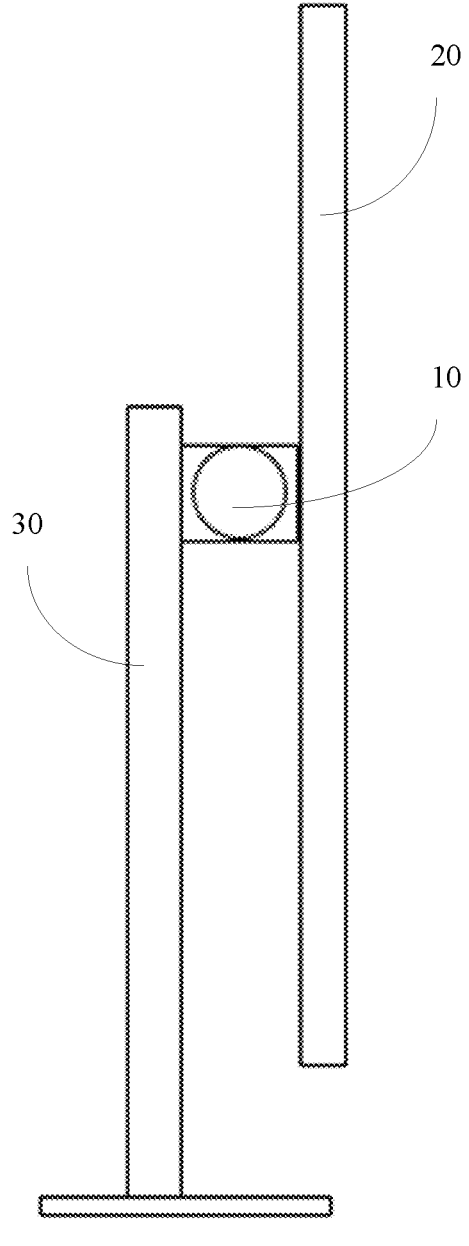
FIG. 1 is a view of a load that uses a conventional rotating shaft apparatus.

To obtain a lightweight feel of adjusting a pitch angle, a conventional rotating shaft apparatus 10 usually uses a torsion spring to counteract a gravitational torque of a load. The conventional rotating shaft apparatus 10 needs to be disposed at the center or a lower position of the load 20. The conventional rotating shaft apparatus 10 needs to occupy large space, and a spacing between the load 20 and a support 30 is large (refer to FIG. 1). This cannot meet a requirement for lightness and thinness of a user.

An embodiment of this disclosure provides a rotating shaft apparatus, including an adapter member, at least one spindle, and a crank-slider mechanism group. The adapter member is fixedly connected to a load. The spindle is fixedly connected to the adapter member. The crank-slider mechanism group includes at least one crank-slider mechanism.

The crank-slider mechanism acts on the spindle to provide a torque. The torque partially or completely counteracts a gravitational torque of the load. An elastic assembly is disposed in the crank-slider mechanism. A spring force of the elastic assembly acts on the spindle, so that the spring force changes with rotation of the spindle. This ensures that the torque of the spindle counteracts the gravitational torque of the load in a rotation process of the spindle. According to the rotating shaft apparatus provided in this disclosure, the crank-slider mechanism is disposed on the spindle, and the elastic assembly is disposed in the crank-slider mechanism to provide a spring force that changes with rotation of a rotating shaft. In this way, the rotating shaft apparatus provides assistance in counteracting the gravitational torque of the load to implement a lightweight feel of an operation of adjusting a pitch angle of the load and eccentric assembly of the rotating shaft apparatus and the load. For example, the rotating shaft apparatus is highly eccentrically disposed at an upper position of a center of gravity of the load. This implements a large pitch angle of the load, reduces space occupied by the rotating shaft apparatus, and meets a requirement for lightness and thinness of the load after the rotating shaft apparatus is installed.

Figure 2A:
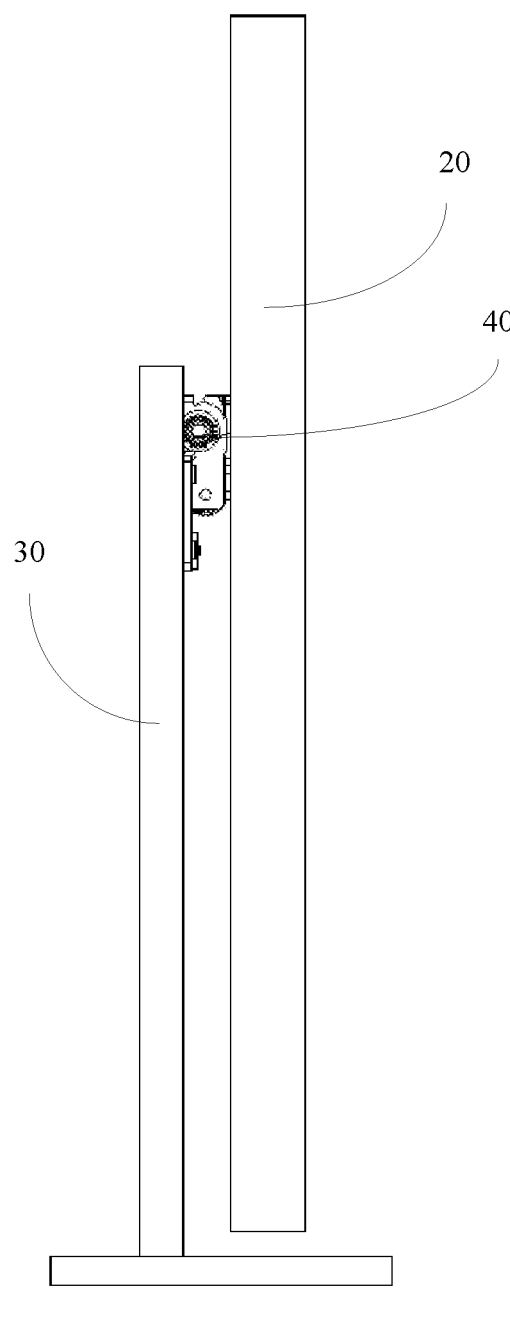
FIG. 2a and FIG. 2b are views of a load that uses a rotating shaft apparatus according to an embodiment of this disclosure.
Figure 2B:
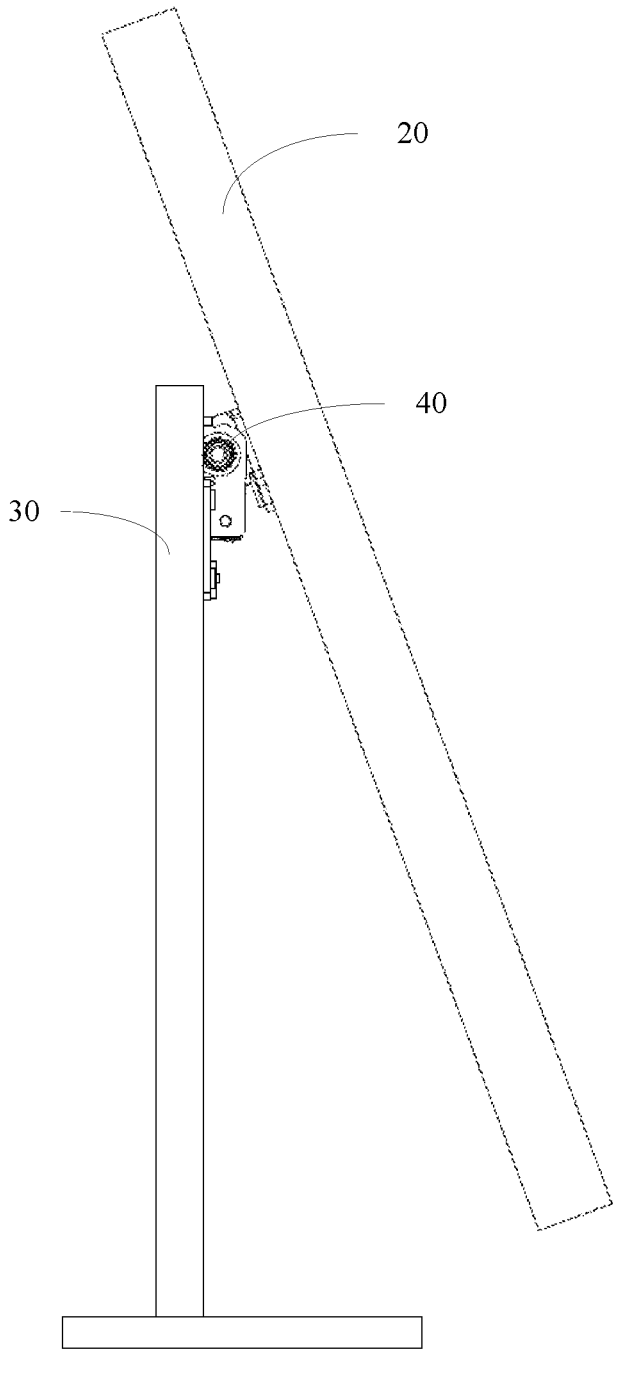

For example, as shown in FIG. 2*a* and FIG. 2*b*, the rotating shaft apparatus 40 may be disposed at an upper position of the center of gravity of the load 20, and does not need to occupy too much space. This implements an extremely small spacing between a support apparatus 30 and the load 20, and meets a requirement for lightness and thinness of a user. In addition, because the rotating shaft apparatus 40 is disposed at the upper position of the center of gravity of the load, the load may have a large pitch angle.

It is easy to understand that the load may be a display apparatus, such as a television, a conference display, and an electronic whiteboard, or any product that needs to adjust a pitch angle or seeks a light and thin appearance and a lightweight operation feel, such as an all-in-one machine and a tablet computer. A type of the load is not limited in this embodiment of this disclosure.

The following describes in detail a structure of the rotating shaft apparatus provided in this embodiment of this disclosure with reference to FIG. 3*a* to FIG. 7*b*.

Figure 3A:
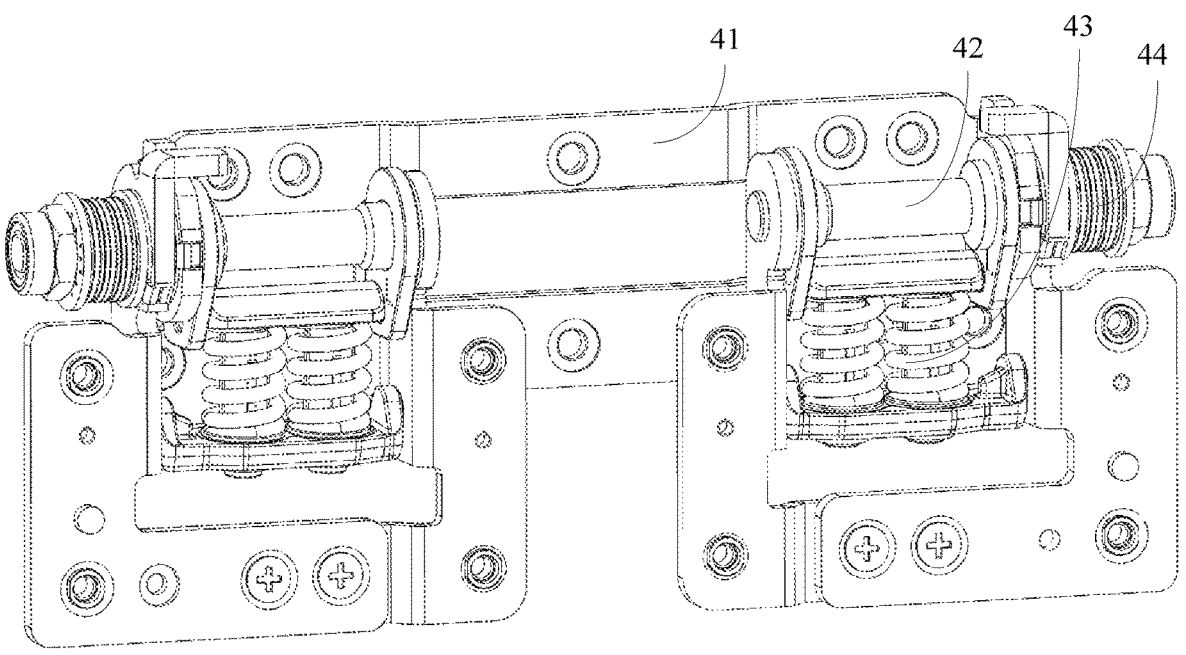
FIG. 3a is a front view of a rotating shaft apparatus according to an embodiment of this disclosure.
Figure 3B:
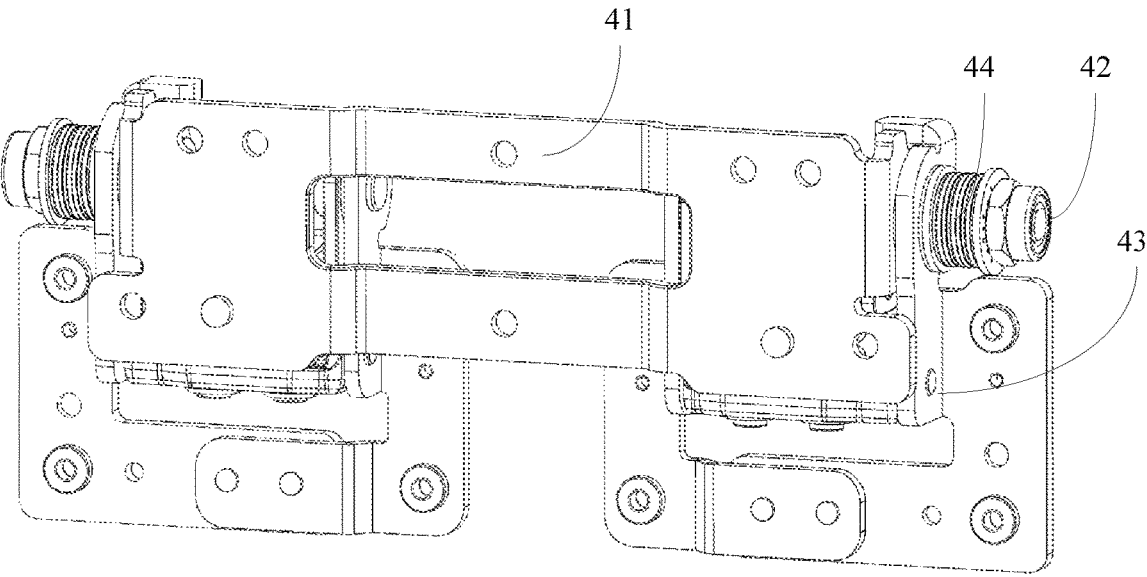
FIG. 3b is a view of a side of an adapter member of a rotating shaft apparatus according to an embodiment of this disclosure.

FIG. 3*a* is a front view of a rotating shaft apparatus according to an embodiment of this disclosure. As shown in FIG. 3*a*, the rotating shaft apparatus 40 includes an adapter member 41, a spindle 42, and a crank-slider mechanism 43. The adapter member 41 is fixedly connected to a load. The spindle 42 is fixedly connected to the adapter member 41. The crank-slider mechanism 43 acts on the spindle 42 to provide a torque. The torque partially or completely counteracts a gravitational torque of the load. An elastic assembly is disposed in the crank-slider mechanism 43. A spring force of the elastic assembly acts on the spindle 42, to enable the spindle 42 to generate a torque.

It may be understood that the adapter member may be fixedly connected to the load in a plurality of manners. For example, the adapter member is fixedly connected to the load through a fastener. A plurality of connection holes (refer to FIG. 3*b*) are provided on the adapter member, threaded holes are provided on the load and correspond to the plurality of connection holes, and then the adapter member and the load are fixedly connected through the fastener (for example, a standard component such as a screw). Alternatively, the adapter member is clamped to the load. For example, several clamping posts are disposed on the adapter member, several dowel holes are provided on the load and correspond to the several clamping posts, and the clamping posts fit in the dowel holes through clamping, to fixedly connect the adapter member and the load. This disclosure does not limit a connection manner in which the adapter member is fixedly connected to the load, and an appropriate connection manner may be selected based on an actual situation.

The elastic assembly includes at least one elastic structure. A shape of the elastic structure changes to generate a spring force. For example, the elastic structure may be a spring structure, such as a compression spring and a gas spring. The elastic structure may alternatively be an elastomer, such as a silicone elastomer and a rubber elastomer. The following uses an example in which the elastic structure is a compression spring to describe a structure of the rotating shaft apparatus.

In a process of adjusting a pitch angle of the load, the load moves to drive the adapter member 41 to move. The adapter member 41 is fixedly connected to the spindle 42, the adapter member 41 drives the spindle 42 to rotate, and in a rotation process of the spindle 42, an amount of compression of the compression spring disposed in the crank-slider mechanism 43 is changed to change a spring force of the compression spring. Therefore, a spring force applied by the crank-slider mechanism 43 to the spindle 42 changes with rotation of the spindle 42, and a torque of the spindle 42 also changes. In this way, in a process of adjusting the pitch angle of the load, a torque generated by the compression spring is transferred to the load through the spindle, and the torque generated by the compression spring keeps following and counteracting the gravitational torque of the load, to implement a lightweight feel of an operation of adjusting a pitch angle of the load.

Figure 4:
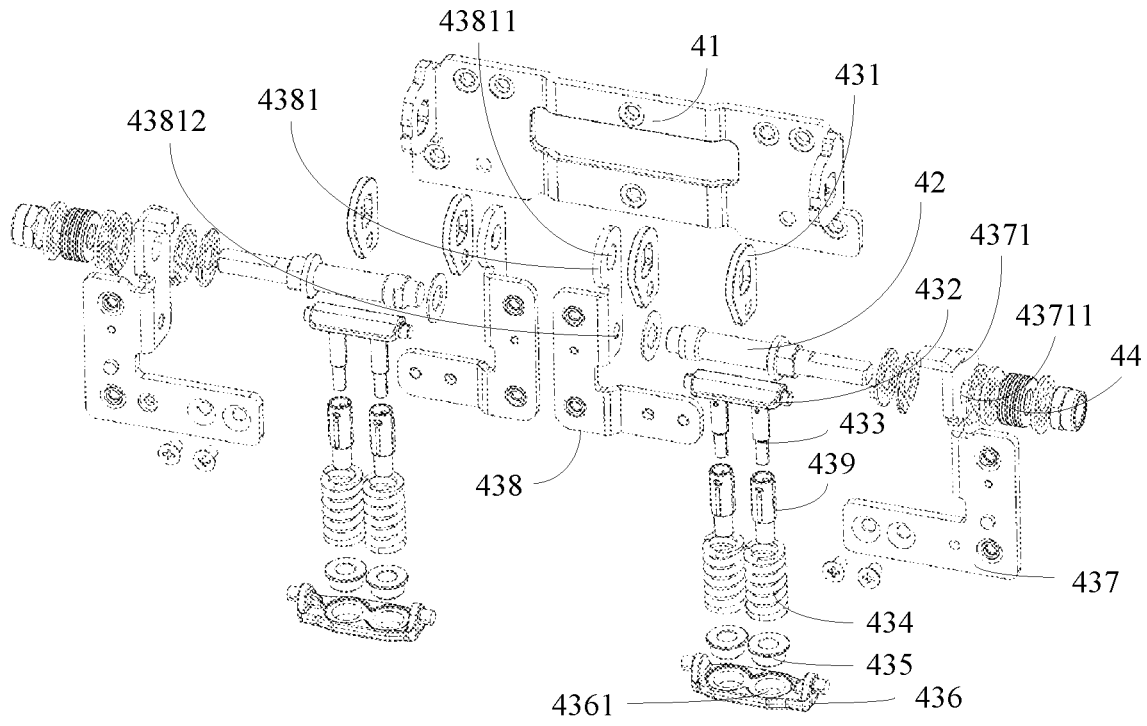
FIG. 4 is an exploded view of a rotating shaft apparatus according to an embodiment of this disclosure.

FIG. 4 is an exploded view of a rotating shaft apparatus according to an embodiment of this disclosure. As shown in FIG. 4, the crank-slider mechanism 43 includes a support (including a main support 437 and a secondary support 438 in FIG. 4), at least one crank 431, a spring guide assembly (including a first support plate 432 and a guide bar 433 in FIG. 4), a second support plate 436, and at least one compression spring 434. The support is connected to the spindle 42, and is rotatable around the spindle. The crank 431 is disposed in the support, one end of the crank 431 in an extension direction is fixedly connected to the spindle 42, and the other end is connected to the spring guide assembly. The spring guide assembly is rotatable relative to the crank 431. The spring guide assembly includes the first support plate 432 and at least one guide bar 433. The first support plate 432 is connected to the other end of the crank 431 in the extension direction, an extension direction of the first support plate 432 is perpendicular to the extension direction of the crank 431, and the first support plate 432 is rotatable relative to the crank 431. One end of the guide bar 433 in an extension direction is fixedly connected to the first support plate 432. The second support plate 436 is connected to the support, and is rotatable relative to the support. A slot is provided on the second support plate 436, and the other end of the guide bar in the extension direction slidably fits in the slot. The compression spring 434 is sleeved on the guide bar 433 and is in a compressed state. One end of the compression spring 434 abuts against the first support plate 432, and the other end abuts against the second support plate 436.

Therefore, the spindle 42 is rotatable relative to the support. The spindle and the support form a revolute pair. The crank 431 is fastened on the spindle 42 and rotates with the spindle 42. The spring guide assembly is rotatably connected to the crank 431. The spring guide assembly and the crank form a revolute pair. The guide bar 433 passes through the slot provided on the second support plate 436 and slidably fits in the slot. The guide bar 433 and the second support plate 436 form a sliding pair. The second support plate 436 is rotatable relative to the support. The second support plate 436 and the support form a revolute pair. Therefore, the crank 431, the spring guide assembly, the second support plate 436, and the support jointly form a crank-slider mechanism. The compression spring is precompressed and disposed between the first support plate 432 and the second support plate 436 to provide a spring force that changes with an amount of compression.

In an example, the support includes a first support arm, a second support arm, and a third support arm. Extension directions of the second support arm and the spindle are the same. The first support arm and the third support arm are respectively disposed at two opposite ends of the second support arm. Both the first support arm and the second support arm extend towards a side close to the spindle. In other words, the support is approximately U-shaped.

Specifically, a first connection plate 4371 is disposed on the first support arm. A second connection plate 4381 is disposed on a second connection arm relative to the first connection plate 4371. A first connection hole 43711 is provided at an end that is of the first connection plate 4371 and that is close to the spindle 42, and a third connection hole is provided at an end that is of the first connection plate 4371 and that is away from the spindle 42. A second connection hole 43811 and a fourth connection hole 43812 are provided at positions that are on the second connection plate 4381 and that correspond to the first connection hole 43711 and the third connection hole. The spindle 42 passes through the first connection hole 43711 and the second connection hole 43811, and rotatably fits in the first connection hole 43711 and the second connection hole 43811. Connection portions are disposed at two ends of the second support plate 436 in an extension direction. The connection portions rotatably fit in the third connection hole and the fourth connection hole 43812. This implements assembly of the support with the spindle and the second support plate.

It is easy to understand that the support may be of an integrated structure. For example, the support is integrally formed. Alternatively, the second support arm, the first support arm, and the third support arm of the support are integrally connected, for example, by welding, to increase strength of the support. Alternatively, the support may be of a split structure. For example, in FIG. 4, the support includes a main support 437 and a secondary support 438. The main support 437 includes a first support arm and a second support arm. The secondary support 438 includes the third support arm and a connection portion disposed at an end that is of the third support arm and that is close to the second support arm. The connection portion is fixedly connected to the second support arm. The split structure of the support facilitates assembly of the support with the spindle and the second support plate. For example, the main support may be first assembled with the spindle and the second support plate, then the secondary support is assembled with the spindle and the second support plate, and finally the main support and the secondary support are fixedly connected.

The main support and the secondary support may be connected in a plurality of manners. For example, the main support and the secondary support are fixedly connected through a fastener, clamped, or plug-connected. An appropriate connection manner may be selected for connection based on an actual situation. This disclosure does not limit the connection manner of the main support and the secondary support.

Figure 5:
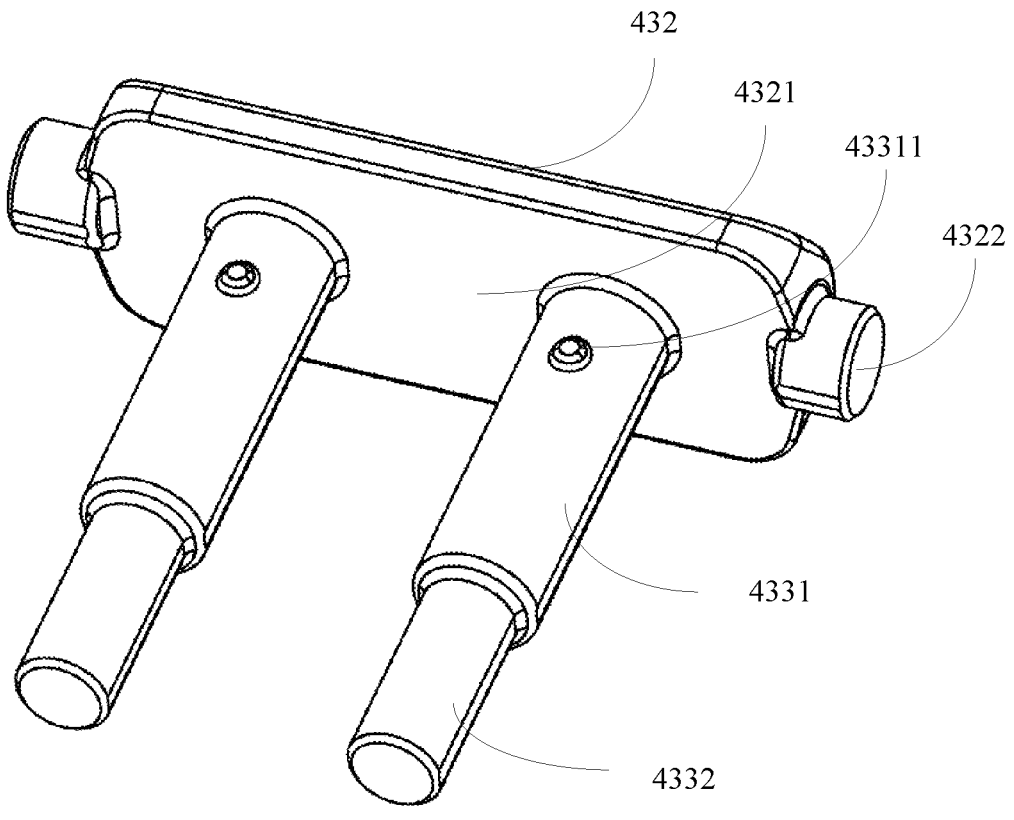
FIG. 5 is a schematic diagram of a structure of a spring guide assembly of a rotating shaft apparatus according to an embodiment of this disclosure.

FIG. 5 is a schematic diagram of a structure of a spring guide assembly of a rotating shaft apparatus according to an embodiment of this disclosure. As shown in FIG. 5, two second rotating shafts 4322 are disposed at two opposite ends of the first support plate 432 in the spring guide assembly of the first support plate 432 in the extension direction. The second rotating shafts 4322 are configured to be rotatably connected to the crank. A wall surface 4321 of a side that is of the first support plate 432 and that is close to a guide post is used as a spring support surface to abut against the compression spring.

For example, a connection hole adapted to the second rotating shaft is provided on the crank, and the second rotating shaft passes through the connection hole, so that the spring guide assembly is rotatably connected to the crank.

The guide bar includes a guide post 4331 and a sliding rod 4332. Extension directions of the guide post 4331 and the sliding rod 4332 are the same. One end of the guide post 4331 in an extension direction is fixedly connected to the first support plate 432, and the other end is fixedly connected to the sliding rod 4332. The sliding rod 4332 is configured to pass through the slot of the second support plate and slidably fit in the slot.

Still refer to FIG. 4. In the rotation process of the spindle, to ensure that a compression spring and an outer wall of the guide bar do not rub against each other and produce noise when the compression spring changes the amount of compression, the crank-slider mechanism 431 further includes a shaft sleeve 439. The shaft sleeve 439 is fixedly sleeved on the guide bar 433, and an end that is of the shaft sleeve 439 and that is close to the second support plate 436 slidably fits in the slot. The compression spring 434 is sleeved on an outer wall of the shaft sleeve 439.

To further reduce the noise caused by a motion of the compression spring in the rotation process of the spindle, the shaft sleeve may be made of a non-metallic material such as silicone or plastic.

Still refer to FIG. 5. In an example, a positioning structure 43311 is disposed on the guide post 4331, and is configured to position the shaft sleeve. For example, the positioning structure may be a dowel pin, a dowel hole adapted to the dowel pin is provided on the shaft sleeve, and the dowel pin fits in the dowel hole to fasten the shaft sleeve on the guide post.

FIG. 6a is a schematic diagram of a structure of a second support plate of a rotating shaft apparatus according to an embodiment of this disclosure. As shown in FIG. 6a, two first rotating shafts 4362 are disposed at two opposite ends of the second support plate in the extension direction. The first rotating shafts 4362 are configured to rotatably fit in the third connection hole and the fourth connection hole that are provided on the support, so that the support is rotatably connected to the second support plate.

An avoidance hole 4361 is provided at a position that is on the second support plate and that corresponds to the sliding rod, so that the sliding rod passes through the avoidance hole, and the sliding rod and the second support plate form a sliding pair.

In a working process of the rotating shaft apparatus, the spring guide assembly rotates in a connection hole of the crank, the sliding rod slides in the avoidance hole, and the second support plate rotates in a connection hole of the support. In this case, the crank, the spring guide assembly, the second support plate, and the support jointly form a crank-slider mechanism.

To adjust the spring force of the compression spring based on a requirement, a spring adjustment shaft sleeve 4363 is further disposed on the second support plate. The spring adjustment shaft sleeve 4363 is in a threaded connection with the avoidance hole 4361. A spring support portion 43631 is disposed at an end that is of the spring adjustment shaft sleeve 4363 and that is close to the compression spring. The spring support portion 43631 abuts against the compression spring. Refer to FIG. 6b, a slot 43632 is provided at a position that is on the spring adjustment shaft sleeve 4363 and that corresponds to the sliding rod. An adjustment opening 43633 is provided at an end face of an end that is of the spring adjustment shaft sleeve 4363 and that is away from the compression spring. The spring adjustment shaft sleeve 4363 is rotated through the adjustment opening 43633, to adjust the spring force provided by the compression spring.

For example, the adjustment opening of the spring adjustment shaft sleeve may be in a plurality of opening forms, such as a slotted opening (refer to FIG. 6b), a crossed opening (refer to FIG. 6c), and an outer hexagon opening (refer to FIG. 6d). An appropriate adjustment opening may be selected based on a requirement. An opening form of the adjustment opening of the spring adjustment shaft sleeve is not limited in this embodiment of this disclosure.

The spring adjustment shaft sleeve is disposed in the rotating shaft apparatus in this embodiment of this disclosure, so that a precompression spring force of the compression spring may be adjusted based on a requirement, to adjust a torque of the rotating shaft. In addition, the spring adjustment shaft sleeve is disposed on the second support plate, to facilitate adjustment of the spring adjustment shaft sleeve. For example, adjustment may be performed at a bottom or a side of the second support plate, and no additional operation such as removing the rotating shaft is needed.

Refer to FIG. 3a to FIG. 4, the at least one spindle 42 includes a first spindle and a second spindle. The at least one crank-slider mechanism 43 includes a first crank-slider mechanism and a second crank-slider mechanism. In other words, the rotating shaft apparatus includes two spindles and crank-slider mechanisms respectively disposed on the two spindles.

The first spindle and the second spindle are disposed on the adapter member 41 at an interval. The first crank-slider mechanism acts on the first spindle to provide a torque. The second crank-slider mechanism acts on the second spindle to provide a torque.

Refer to FIG. 3a to FIG. 4, each of the at least one crank 431 includes a first crank and a second crank. The at least one guide bar 433 includes a first guide bar and a second guide bar. The at least one compression spring 434 includes a first compression spring and a second compression spring. The first crank and the second crank are disposed on the spindle 42 at an interval. A fifth connection hole is provided at an end that is of the first crank and that is away from the spindle 42. A sixth connection hole is provided on the second crank relative to the fifth connection hole. Two second rotating shafts are disposed on the first support plate. The two second rotating shafts respectively pass through the fifth connection hole and the sixth connection hole, and rotatably fit in the fifth connection hole and the sixth connection hole. The first guide bar and the second guide bar are disposed on the first support plate 432 at an interval. The first compression spring is sleeved on the first guide bar. The second compression spring is sleeved on the second guide bar.

According to the rotating shaft apparatus provided in this embodiment of this disclosure, two spindles are disposed, and two crank-slider mechanisms are disposed corresponding to the two spindles. This ensures stability of the rotating shaft apparatus in a rotation process of a load.

In an example, the first crank-slider mechanism and the second crank-slider mechanism may have a same quantity of guide bars and compression springs. For example, the first crank-slider mechanism and the second crank-slider mechanism each have two guide bars and two compression springs, and the two compression springs are respectively sleeved on the two guide bars. Alternatively, the first crank-slider mechanism and the second crank-slider mechanism each have one guide bar and one compression spring, and the compression spring is sleeved on the guide bar.

The first crank-slider mechanism and the second crank-slider mechanism may have different quantities of guide bars and compression springs. For example, the first crank-slider mechanism has one guide bar and one compression spring, and the compression spring is sleeved on the guide bar. The second crank-slider mechanism has two guide bars and two compression springs, and the two compression springs are respectively sleeved on the two guide bars.

In an example, the rotating shaft apparatus further includes a damping member 44. The damping member 44 is disposed on the spindle to provide a damping force (refer to FIG. 3a). For example, the damping member is a disc spring friction plate or a coated damping member, or the like. An appropriate damping member may be selected based on a requirement. This is not limited in this disclosure.

A working principle of the rotating shaft apparatus in this embodiment of this disclosure is as follows: This following uses an example in which the load is a display, the rotating shaft apparatus is located above a center of gravity of the display, a vertical angle of the display is 0°, and a working angle of the display is 0° to 25°. The crank-slider mechanism may be actually adjusted based on different display installation positions and rotation angles.

As shown in FIG. 7a and FIG. 7b, a process of tilting the display up by 0° to 25° is used as an example. In this embodiment of this disclosure, relative positions of the crank 431, the spindle 42, the adapter member 41, and the display 21 are fixed, and the crank 431, the spindle 42, the adapter member 41, and the display 21 rotate synchronously during adjustment of a pitch angle. In the tilting-up process, a distance between a center of gravity of the display and an axis of the spindle 42 increases, and a gravitational torque of the display increases. In a rotation process, the crank 431 drives the first support plate 432 to move around the spindle 42 along an arc. The guide bar 433 slides relative to the second support plate 436. A relative distance between the first support plate 432 and the second support plate 436 increases. The amount of compression of the compression spring 434 disposed between the first support plate 432 and the second support plate 436 decreases. The spring force of the compression spring 434 decreases. The second support plate 436 rotates relative to the main support 437 and the secondary support 438. A direction of the spring force of the compression spring 434 keeps being parallel to the guide bar 433 and points upwards. Therefore, in the tilting-up process, an arm of the spring force that is of the compression spring 434 and that acts on the spindle 42 through the crank 431 increases. In this example, a speed at which an arm of force of the compression spring 434 increases is higher than a speed at which the spring force of the compression spring 434 decreases. Therefore, a torque converted from the spring force to the spindle 42 largely increases, and the torque and the gravitational torque of the display 21 have a same change trend but opposite directions. In this case, a moment of the spring force and the gravitational torque keeps counteracting each other in the tilting-up process. Similarly, the moment of the spring force and the gravitational torque keeps counteracting each other in a tilting-down process. Therefore, when performing an operation of adjusting a pitch angle of the display 21, a user only needs to overcome a damping torque generated by the damping member or the like, and the damping torque may be adjusted based on an actual requirement. Therefore, a lightweight feel of the operation of adjusting the pitch angle may be implemented for the display on which the rotating shaft apparatus provided in this embodiment of this disclosure is disposed.

An implementation principle of a minimal spacing between the display and the support apparatus in this embodiment of this disclosure is as follows: The following uses an example in which the rotating shaft apparatus is located above the center of gravity of the display, the vertical angle of the display is 0°, and the working angle of the display is 0° to 25°. The crank-slider mechanism may be vertically disposed as shown in FIG. 7a. In a whole process, a height of a triangle formed by the support acting as a long side, the crank 431, and the guide bar 433 changes slightly, and the crank-slider mechanism may be extremely thin in a height direction of the triangle. Therefore, the rotating shaft apparatus may be hidden between the support apparatus and the display, to implement a light and thin appearance effect of the entire machine where the support apparatus is closely attached to the display, as shown in FIG. 2a.

According to the load using the rotating shaft apparatus provided in embodiments of this disclosure, a spring torque generated by the crank-slider mechanism and a gravity torque of the load have a same trend (refer to FIG. 8) and approximate torque values, a tilting-down operation force and a tilting-up operation force acting on the load fluctuate slightly, and a total operation force is low. An example in which a load is 6 kg and an eccentric distance is 70 mm is used. A theoretical range of the tilting-down operation force and the tilting-up operation force is 3 to 5.5 N (refer to FIG. 9).

This disclosure further provides an electronic device, including a support apparatus, the rotating shaft apparatus in the foregoing embodiments, and a display apparatus or an all-in-one machine. An end that is of a support and that is away from a spindle is fixedly connected to the support apparatus. An adapter member is fixedly connected to the display apparatus or the all-in-one machine.

In a possible implementation, a connection position between the adapter member and the display apparatus is above a center of gravity of the display apparatus; or, a connection position between the adapter member and the all-in-one machine is above a center of gravity of the all-in-one machine. This implements eccentric assembly of a rotating shaft and the display apparatus or the all-in-one machine, implements a large pitch angle of the display apparatus or the all-in-one machine, and does not affect a lightweight feel of an operation of adjusting the pitch angle of the display apparatus or the all-in-one machine.

In another possible implementation, an accommodation cavity is provided at an end that is of the support apparatus and that is close to the display apparatus or the all-in-one machine, and the rotating shaft apparatus is disposed in the accommodation cavity. In this way, the rotating shaft device is hidden in the support apparatus. This reduces a distance between the display apparatus or the all-in-one machine and the support, and implements a light and thin appearance effect where the support apparatus is closely attached to the display apparatus or the all-in-one machine.

In descriptions of this specification, specific features, structures, materials, or characteristics may be combined in a suitable manner in any one or more embodiments or examples.

Finally, it should be noted that the foregoing embodiments are only intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof. These modifications or replacements do not make the essence of the corresponding technical solutions deviate from the scope of the technical solutions in embodiments of this disclosure.

What is claimed is:

1. A rotating shaft apparatus, comprising:
an adapter member, configured to fixedly connect to a load;
at least one spindle, fixedly connected to the adapter member; and
a crank-slider mechanism group, comprising one or more crank-slider mechanisms that are configured to act on the spindle to provide a torque that partially or completely counteracts a gravitational torque of the load; and each crank-slider mechanism of the one or more crank-slider mechanisms comprises:
a support, connected to the spindle and rotatable around the spindle;
at least one crank, disposed in the support, wherein one end of the crank in an extension direction is fixedly connected on the spindle and rotates with the spindle;
a spring guide assembly, comprising: a first support plate, wherein the first support plate is connected to the other end of the crank in the extension direction, and the first support plate is rotatable relative to the crank; and at least one guide bar, wherein one end of the guide bar in an extension direction is fixedly connected to the first support plate;
a second support plate, connected to the support and rotatable relative to the support, wherein a slot is provided on the second support plate, and the other end of the guide bar in the extension direction slidably fits in the slot; and
an elastic assembly, comprising at least one elastic structure, wherein the elastic structure is sleeved on the guide bar and is in a compressed state, one end of the elastic structure abuts against the first support plate, and the other end abuts against the second support plate.

2. The rotating shaft apparatus according to claim 1, wherein the each crank-slider mechanism further comprises a shaft sleeve, the shaft sleeve is fixedly sleeved on the guide bar, and an end that is of the shaft sleeve and that is close to the second support plate slidably fits in the slot; and the elastic structure is sleeved on an outer wall of the shaft sleeve.

3. The rotating shaft apparatus according to claim 2, wherein the guide bar comprises a guide post and a sliding rod, extension directions of the guide post and the sliding rod are the same, one end of the guide post in an extension direction is fixedly connected to the first support plate, the other end is fixedly connected to the sliding rod, and the sliding rod passes through the slot; and a positioning structure is disposed on the guide post, and is configured to position the shaft sleeve.

4. The rotating shaft apparatus according to claim 3, wherein the positioning structure is a dowel pin, a dowel hole adapted to the dowel pin is provided on the shaft sleeve, and the dowel pin fits in the dowel hole to fasten the shaft sleeve on the guide post.

5. The rotating shaft apparatus according to claim 1, wherein the each crank-slider mechanism further comprises a spring adjustment shaft sleeve; and
an avoidance hole is provided at a position that is on the second support plate and that corresponds to the guide bar, the spring adjustment shaft sleeve is in a threaded connection with the avoidance hole, a spring support portion is disposed at an end that is of the spring adjustment shaft sleeve and that is close to the elastic structure, the spring support portion abuts against the elastic structure, the slot is provided at a position that is on the spring adjustment shaft sleeve and that corresponds to the guide bar, an adjustment opening is provided at an end face of an end that is of the spring adjustment shaft sleeve and that is away from the elastic structure, and the spring adjustment shaft sleeve is rotated through the adjustment opening, to adjust a spring force of the elastic structure.

6. The rotating shaft apparatus according to claim 1, wherein the support comprises a first support arm, a second support arm, and a third support arm, extension directions of the second support arm and the spindle are the same, the first support arm and the third support arm are respectively disposed at two opposite ends of the second support arm, and both the first support arm and the second support arm extend towards a side close to the spindle; and
a first connection plate is disposed on the first support arm, a second connection plate is disposed on a second connection arm relative to the first connection plate, a first connection hole is provided at an end that is of the first connection plate and that is close to the spindle, a second connection hole is provided at a position that is on the second connection plate and that is opposite to the first connection hole, and the spindle passes through the first connection hole and the second connection hole, and rotatably fits in the first connection hole and the second connection hole.

7. The rotating shaft apparatus according to claim 6, wherein a third connection hole is provided at an end that is of the first connection plate and that is away from the spindle, and a fourth connection hole is provided on the second connection plate relative to the third connection hole; and
two first rotating shafts are respectively disposed at two opposite ends of the second support plate in an extension direction, and the two first rotating shafts respectively pass through the third connection hole and the fourth connection hole, and rotatably fit in the third connection hole and the fourth connection hole.

8. The rotating shaft apparatus according to claim 7, wherein the support is of a split structure and comprises a main support and a secondary support, the main support comprises the first support arm and the second support arm, the secondary support comprises the third support arm and a connection portion that is disposed at an end that is of the third support arm and that is close to the second support arm, and the connection portion is fixedly connected to the second support arm.

9. The rotating shaft apparatus according to claim 1, wherein the rotating shaft apparatus further comprises a damping member, and the damping member is disposed on the spindle to provide a damping force.

10. The rotating shaft apparatus according to claim 1, wherein the at least one spindle comprises a first spindle and a second spindle, and the crank-slider mechanism group comprises a first crank-slider mechanism and a second crank-slider mechanism; and the first spindle and the second spindle are disposed on the adapter member at an interval, the first crank-slider mechanism acts on the first spindle to provide a torque, and the second crank-slider mechanism acts on the second spindle to provide a torque.

11. The rotating shaft apparatus according to claim 1, wherein the at least one crank comprises a first crank and a second crank, the at least one guide bar comprises a first guide bar and a second guide bar, and the elastic assembly comprises a first elastic structure and a second elastic structure;

the first crank and the second crank are disposed on the spindle at an interval, a fifth connection hole is provided at an end that is of the first crank and that is away from the spindle, a sixth connection hole is provided on the second crank relative to the fifth connection hole, two second rotating shafts are respectively disposed at two opposite ends of the first support plate in an extension direction, and the two second rotating shafts respectively pass through the fifth connection hole and the sixth connection hole, and rotatably fit in the fifth connection hole and the sixth connection hole; and the first guide bar and the second guide bar are disposed on the first support plate at an interval, the first elastic structure is sleeved on the first guide bar, and the second elastic structure is sleeved on the second guide bar.

12. An electronic device, comprising a rotating shaft apparatus, and a display apparatus or an all-in-one machine; wherein the rotating shaft apparatus comprises:

an adapter member, fixedly connected to a load comprising the display apparatus or the all-in-one machine;

at least one spindle, fixedly connected to the adapter member; and a crank-slider mechanism group, comprising one or more crank-slider mechanisms that act on the spindle to provide a torque, wherein the torque partially or completely counteracts a gravitational torque of the load; and each crank-slider mechanism of the one or more crank-slider mechanisms comprises:

a support, connected to the spindle and rotatable around the spindle, wherein an end that is of the support and that is away from the at least one spindle is fixedly connected to the support;

at least one crank, disposed in the support, wherein one end of the crank in an extension direction is fixedly connected on the spindle and rotates with the spindle;

a spring guide assembly, comprising: a first support plate, wherein the first support plate is connected to the other end of the crank in the extension direction, and the first support plate is rotatable relative to the crank; and at least one guide bar, wherein one end of the guide bar in an extension direction is fixedly connected to the first support plate;

a second support plate, connected to the support and rotatable relative to the support, wherein a slot is provided on the second support plate, and the other end of the guide bar in the extension direction slidably fits in the slot; and an elastic assembly, comprising at least one elastic structure, wherein the elastic structure is sleeved on the guide bar and is in a compressed state, one end of the elastic structure abuts against the first support plate, and the other end abuts against the second support plate.

13. The electronic device according to claim 12, wherein a connection position between the adapter member and the display apparatus is above a center of gravity of the display apparatus; or a connection position between the adapter member and the all-in-one machine is above a center of gravity of the all-in-one machine.

14. The electronic device according to claim 12, wherein an accommodation cavity is provided at an end that is of the support and that is close to the display apparatus or the all-in-one machine, and the rotating shaft apparatus is disposed in the accommodation cavity.

15. The electronic device according to claim 12, wherein the each crank-slider mechanism further comprises a shaft sleeve, the shaft sleeve is fixedly sleeved on the guide bar, and an end that is of the shaft sleeve and that is close to the second support plate slidably fits in the slot; and the elastic structure is sleeved on an outer wall of the shaft sleeve.

16. The electronic device according to claim 15, wherein the guide bar comprises a guide post and a sliding rod, extension directions of the guide post and the sliding rod are the same, one end of the guide post in an extension direction is fixedly connected to the first support plate, the other end is fixedly connected to the sliding rod, and the sliding rod passes through the slot; and a positioning structure is disposed on the guide post, and is configured to position the shaft sleeve.

17. The electronic device according to claim 16, wherein the positioning structure is a dowel pin, a dowel hole adapted to the dowel pin is provided on the shaft sleeve, and the dowel pin fits in the dowel hole to fasten the shaft sleeve on the guide post.

18. The electronic device according to claim 12, wherein the each crank-slider mechanism further comprises a spring adjustment shaft sleeve; and an avoidance hole is provided at a position that is on the second support plate and that corresponds to the guide bar, the spring adjustment shaft sleeve is in a threaded connection with the avoidance hole, a spring support portion is disposed at an end that is of the spring adjustment shaft sleeve and that is close to the elastic structure, the spring support portion abuts against the elastic structure, the slot is provided at a position that is on the spring adjustment shaft sleeve and that corresponds to the guide bar, an adjustment opening is provided at an end face of an end that is of the spring adjustment shaft sleeve and that is away from the elastic structure, and the spring adjustment shaft sleeve is rotated through the adjustment opening, to adjust a spring force of the elastic structure.

19. The electronic device according to claim 12, wherein the support comprises a first support arm, a second support arm, and a third support arm, extension directions of the second support arm and the spindle are the same, the first support arm and the third support arm are respectively disposed at two opposite ends of the second support arm, and both the first support arm and the second support arm extend towards a side close to the spindle; and a first connection plate is disposed on the first support arm, a second connection plate is disposed on a second connection arm relative to the first connection plate, a first connection hole is provided at an end that is of the first connection plate and that is close to the spindle, a second connection hole is provided at a position that is on the second connection plate and that is opposite to the first connection hole, and the spindle passes through the first connection hole and the second connection hole, and rotatably fits in the first connection hole and the second connection hole.

20. The electronic device according to claim 19, wherein a third connection hole is provided at an end that is of the first connection plate and that is away from the spindle, and a fourth connection hole is provided on the second connection plate relative to the third connection hole; and two first rotating shafts are respectively disposed at two opposite ends of the second support plate in an extension direction, and the two first rotating shafts respectively pass through the third connection hole and the fourth connection hole, and rotatably fit in the third connection hole and the fourth connection hole.

* * * * *

20